United States Patent [19]

Glennon

[11] Patent Number: 4,559,593
[45] Date of Patent: Dec. 17, 1985

[54] METHOD AND APPARATUS FOR REDUCING THE NUMBER OF SWITCHING TRANSITIONS IN A VOLTAGE SOURCE INVERTER

[75] Inventor: Timothy F. Glennon, Rockford, Ill.

[73] Assignee: Sundstrand Corporation, Rockford, Ill.

[21] Appl. No.: 534,170

[22] Filed: Sep. 19, 1983

[51] Int. Cl.$^4$ ............................................. H02M 1/14
[52] U.S. Cl. ......................................... 363/41; 363/98
[58] Field of Search .................. 363/15, 16, 17, 98, 363/39, 40, 41, 56, 63, 132; 318/801, 802

[56] References Cited

U.S. PATENT DOCUMENTS

| | | |
|---|---|---|
| 3,523,236 | 8/1970 | Howell et al. |
| 3,538,420 | 11/1970 | Klein . |
| 3,609,507 | 9/1971 | Beck ........................................ 363/56 |
| 3,694,718 | 9/1972 | Graf et al. ............................. 318/227 |
| 3,971,972 | 7/1976 | Stich ....................................... 363/41 |
| 4,291,368 | 9/1981 | Yarema et al. ......................... 363/41 |

FOREIGN PATENT DOCUMENTS 6709086 1/1968 Netherlands .

*Primary Examiner*—Peter S. Wong
*Assistant Examiner*—Anita M. Ault
*Attorney, Agent, or Firm*—Wood, Dalton, Phillips, Mason & Rowe

[57] ABSTRACT

A method and apparatus for controlling switches in an n-phase static inverter of the bridge type is disclosed wherein the inverter includes n pairs of switches connected across two DC voltages, with a phase output being developed at the junction between switches of each pair. In such an inverter, at any particular time, $n_1$ phase outputs are connected to one of the DC voltages while $n_2$ phase outputs are connected to the other DC voltage, where $n_1 \leq n_2$ and $n_1 + n_2 = n$. The $n_1$ phase outputs are identified by logic circuitry and the switches associated with such phase outputs are operated during times when a pulse width modulation waveform is in a low state so that all phase outputs are connected to the same DC voltage. The method and apparatus of the present invention reduces the number of switching occurrences to the minimum required to achieve defined applied voltage pulse width modulation. Further, the method and apparatus of the present invention does not result in the generation of regenerative currents, and hence various types of DC sources may be used and the DC bus filter may be reduced or eliminated.

22 Claims, 6 Drawing Figures

METHOD AND APPARATUS FOR REDUCING THE NUMBER OF SWITCHING TRANSITIONS IN A VOLTAGE SOURCE INVERTER

DESCRIPTION

1. Technical Field

The present invention relates generally to inverter controls and more particularly to a method and apparatus for controlling switches in an inverter bridge.

2. Background Art

Power supply equipment for energizing motors or other high-power loads often utilize an inverter for converting DC power into polyphase constant or variable frequency and voltage AC power. The source of DC power may comprise simply a battery or a generator driven by a prime mover, the output of which is rectified to produce constant voltages on a DC bus.

Typically, the inverter includes a series of switching elements arranged in a bridge configuration which are coupled across the voltages on the DC bus. For a three-phase static inverter, the bridge topology typically comprises three pairs of switching transistors connected across the DC bus voltages with the three-phase voltages being developed at junctions between transistors of each pair. The transistors are controlled by pulse width modulation, or PWM, circuitry which selectively energizes particular transistors in the inverter as a function of time to ensure that the proper magnitude and frequency of AC voltage is applied to the load.

This arrangement for a power supply is advantageous since it eliminates the need for heavy SCR inverters or electromechanical drives to ensure that AC voltages of correct frequency are delivered to the load. However, it has been found that in the case of high-power dissipating loads, such as motors at the 350 horsepower level, inverter losses become significant. Specifically, the switching transistors dissipate large amounts of power when they are switched from an off condition to an on condition, or vice versa, due to the large currents and voltages the transistors are subjected to. The efficiency of the inverter is related to the number of switching transitions of the transistors, whether on-to-off or off-to-on.

A conventional way of controlling switches in a three-phase inverter is to connect two of the phases to one of the DC bus voltages (or rail) and to connect the remaining phase to the other DC bus voltage (or rail) during those times that a PWM waveform is in a high state and to turn off or open all of the switches in the inverter during those times that the PWM wave is in a low state. This type of control scheme results in a total of six switching transitions for the inverter during one period of the PWM waveform, i.e., three of the switches are closed (or turned on) when the PWM wave assumes the high state and the same three switches are opened (or turned off) when the PWM wave assumes the low state.

One attempt to reduce the number of switching transitions in an inverter is disclosed in Graf et al. U.S. Pat. No. 3,694,718. Graf discloses a three-phase inverter which is controlled similar to conventional control schemes in that two of the phases are connected to one rail while the remaining phase is connected to the other rail during times when the PWM wave is in a high state. However, Graf differs from other control schemes in that when the PWM wave assumes a low state, the switch connecting the remaining phase to the other rail is opened. For example, if phases A and B are connected to a first rail and phase C is connected to a second rail during the time when the PWM wave is in a high state, then when the PWM wave switches to the low state the switch connecting phase C to the second rail is opened. If current is entering phase C from the second rail at the time the switch is opened, a diode connected between phase C and the first rail conducts and clamps all three-phase voltages to the first rail, thereby causing the voltage across the load to be zero. On the other hand, if current was exiting phase C at the time the switch was opened and if the load connected thereto has an inductive reactance, then such current would continue to conduct through the load and a diode connected between phase C and the second rail, thereby causing phase C to momentarily remain at the second rail voltage while phases A and B are at the first rail voltage.

The control scheme of Graf et al. apparently results in a reduction in the number of transitions for switches in the inverter, i.e., one of the switches is opened when the PWM wave assumes a low state and the same switch is closed when the PWM wave assumes a high state, resulting in a total of two transitions per period of the PWM waveform. However, the Graf et al. control scheme does not result in true voltage control since the voltage through the switched phase (i.e. phase C in the above example) is a function of the current therethrough immediately prior to switching.

Furthermore, the Graf et al. control scheme causes regenerative currents to be delivered back to the source of DC potential, thereby requiring relatively large DC bus filters to accept the regenerative currents or a resistive network connected across the DC bus to dissipate the current. Further, the Graf et al. control scheme cannot be used with sources of DC current which cannot accept regenerative currents, such as lithium thionyl chloride batteries.

DISCLOSURE OF THE INVENTION

In accordance with the present invention, an n-phase inverter having n pairs of switches connected across first and second rails with phase voltages developed at the junction between switches of each associated pair is controlled to minimize the number of switching occurrences necessary to provide a defined applied voltage to a load without the generation of regenerative currents caused by switching in response to a PWM wave generated by a PWM modulation control.

For example, in a three-phase inverter, a set of three phase timing or fundamental waveforms are generated which represent the condition of the switches in the inverter when the PWM wave is in a high state. The fundamental waveforms are analyzed to determine which of the three phases is coupled to one of the rails while the remaining two phases are coupled to the other rail during the time the PWM wave is in the high state. When the PWM wave switches to a low state, that phase which is connected to the one rail is disconnected therefrom and is connected to the other rail by changing the states of the switches associated therewith, thereby causing the voltage across a load connected to the output of the inverter to be zero. The control of the present invention results in a reduction in the total number of switching transitions, since only those two switches which connect the switched phase to the upper or lower rail are operated twice during each period of the PWM wave, resulting in four on-to-off or off-to-on transitions for each period of the PWM wave.

Furthermore, the voltage applied to the load is not dependent upon the current in the switched phase since all phases are unequivocally maintained at the same voltage during the time the PWM wave is in the low state. Hence, the inverter operates as a controlled voltage source regardless of load conditions. Additionally, the operation of the inverter does not result in the generation of regenerative currents, and hence DC voltage sources which cannot accept regenerative currents may be used and/or the size of the DC bus filter may be reduced or eliminated altogether.

BEST MODE FOR CARRYING OUT THE INVENTION

Figure 1:
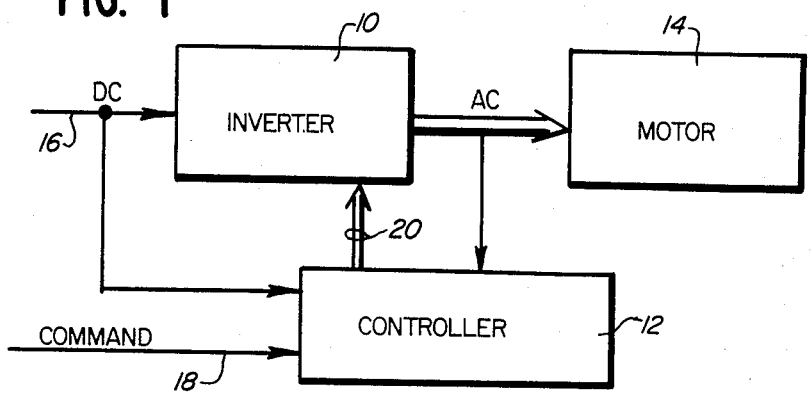
FIG. 1 is a block diagram of an inverter system for converting DC voltage into n-phase AC voltage to drive a load, such as a motor.

Referring to FIG. 1, a static inverter 10 converts a DC voltage into n-phase AC under control from a controller 12 to drive a load, such as a motor 14. The controller 12 in turn operates in response to various operating parameters of the system shown in FIG. 1, such as the current developed in one phase of the inverter 10, the voltage on a DC bus 16, and a speed command signal generated over a line 18. The controller 12 develops a plurality of switch operating signals for switches in the inverter 10 over a series of lines 20 to control the AC phase voltages developed thereby.

DC voltage levels are generated on the DC bus 16 by a source of DC potential, such as a battery or by a generator and rectifier arrangement (not shown).

Figure 2:
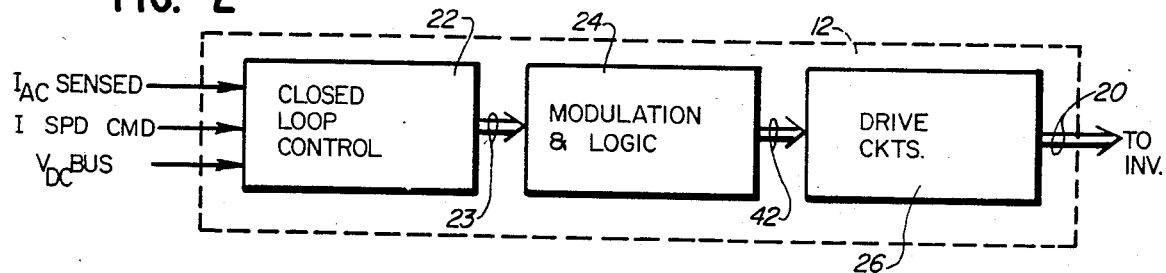
FIG. 2 is a block diagram of the controller shown in FIG. 1.

Referring now to FIG. 2, the controller 12 includes a closed loop control 22 which receives signals representing the current developed in one of the phases of the inverter 10, a command signal representing the desired speed of the motor 14 and a signal representing the voltage on the DC bus. The closed loop control develops control signals on lines 23 for a modulation and logic circuit 24 which is described in greater detail in connection with FIGS. 3 and 4 hereinafter. The modulation and logic circuit 24 generates a series of control signals for optically coupled drive circuits 26 which in turn generate the switch operating signals over the lines 20.

Figure 3:
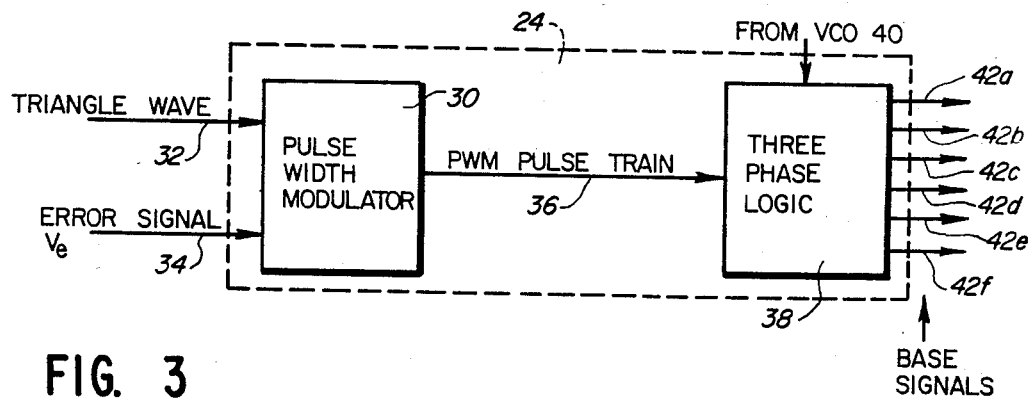
FIG. 3 is a block diagram of the modulation and logic circuitry shown in FIG. 2.

Referring now to FIG. 3, the modulation and logic circuit 24 includes a pulse width modulator 30 which receives as inputs a triangle wave over a line 32 and an error signal $V_e$ over a line 34. The pulse width modulator 30 develops a PWM wave or pulse train on a line 36 which is a function of the level of the error signal $V_e$ and the frequency of the triangle wave on line 32. The pulse width modulator 30 is of conventional construction and forms no part of the present invention.

Figure 5:
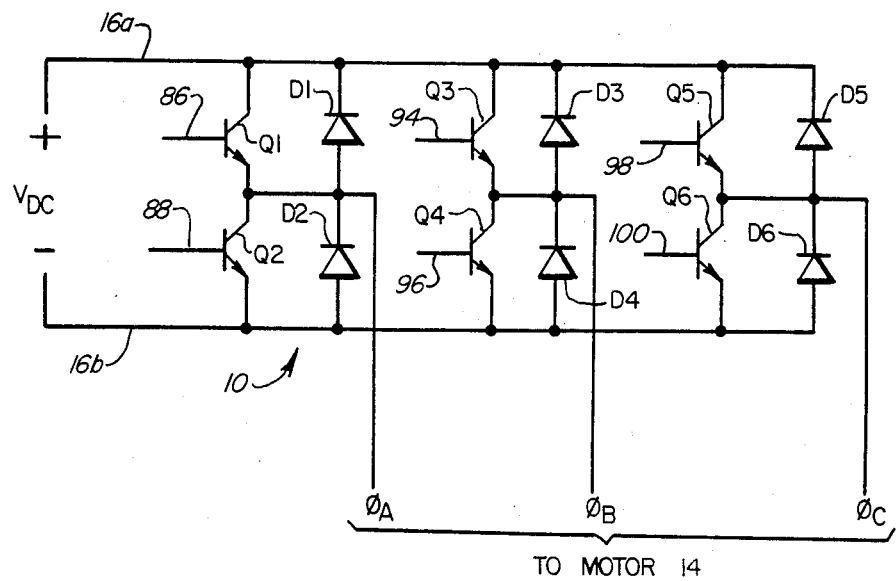
FIG. 5 is a simplified schematic diagram of the inverter topology shown in block diagram form in FIG. 1.

For purposes of clarity, it is initially assumed that the method and apparatus of the present invention are used to control the three-phase inverter having phase outputs A, B and C shown in FIG. 5, it being understood that an inverter having a greater number of phases may be alternatively controlled thereby.

The PWM pulse train on the line 36 is coupled to three-phase logic circuitry 38 which also receives as an input a clock signal from a voltage controlled oscillator, or VCO, 40. The three-phase logic circuitry 38 develops the series of control signals, one for each switch in the inverter 10. In the case of the three-phase inverter shown in FIG. 5, there are three pairs of power transistor switches Q1–Q6 coupled across first and second voltage levels generated on upper and lower rails 16a, 16b of the DC bus 16. There are, accordingly, a set of six control signals generated by the three-phase logic which are coupled over lines 42a–42f to the drive circuitry 26 shown in FIG. 2. The switch operating signals from the drive circuitry 26 are coupled to the bases of transistors Q1–Q6, FIG. 5, to allow selective connection of each phase to either the upper rail 16a or lower rail 16b of the DC bus 16. Additionally, freewheeling diodes D1–D6 are connected across the collector-emitter circuits of each of the transistors Q1–Q6 in a conventional manner.

It should be noted that other types of switches may be employed in the inverter, such as SCR's, triacs or the like, provided that appropriate commutating and/or drive circuitry is also used.

Figure 4:
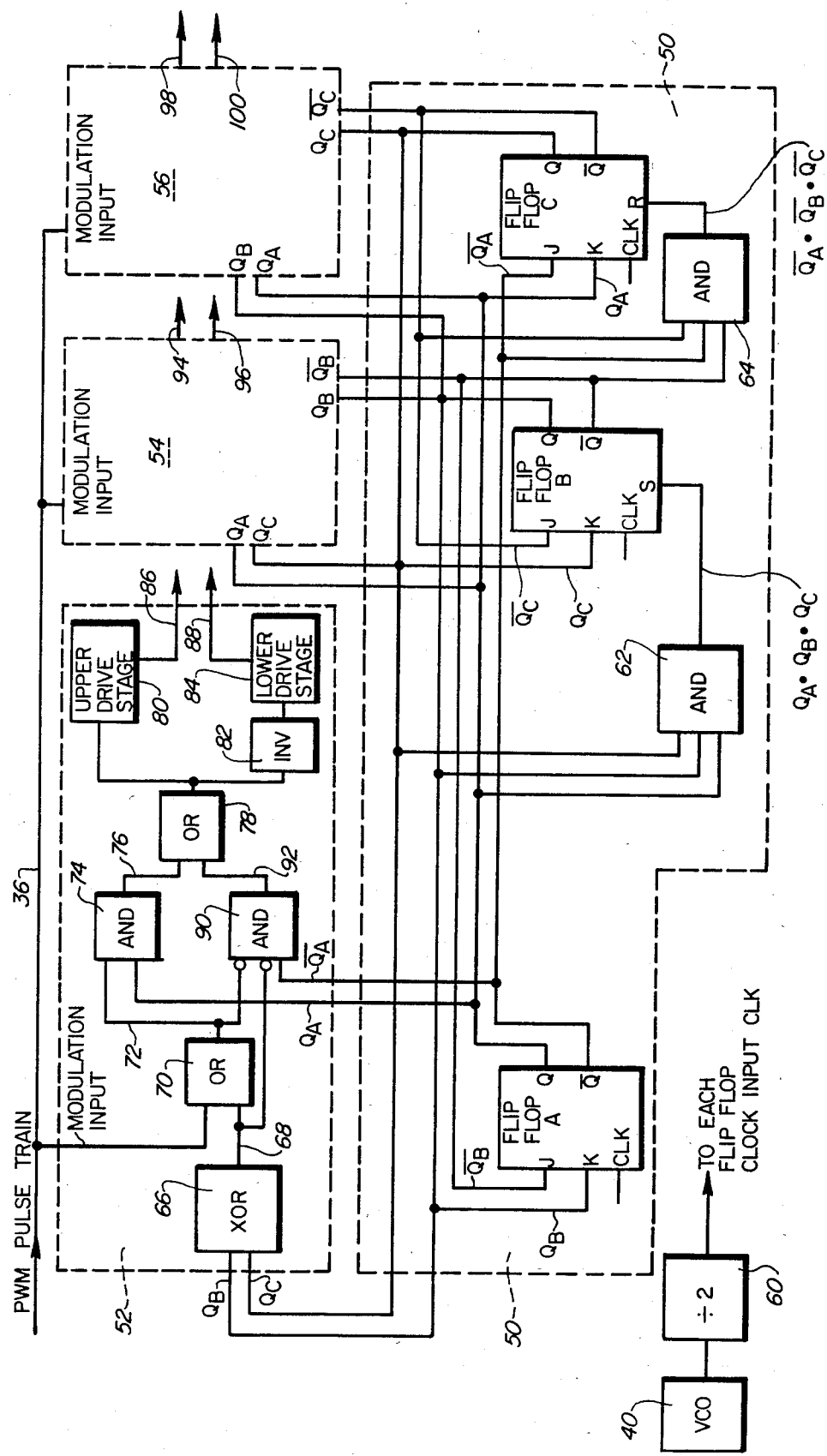
FIG. 4 is a schematic diagram of the block diagram of FIG. 3.

Referring now to FIG. 4, there is illustrated in greater detail the three-phase logic circuitry 38 shown in FIG. 3. The circuitry 38 includes a three-stage counter 50 which generates three phase timing or fundamental waveforms $Q_A$, $Q_B$ and $Q_C$, illustrated in FIG. 6, and three signal generators 52,54,56, which receive the waveforms from the three-stage counter 50. The signal generators 52,54,56 are identical in terms of components located within the dashed lines, and hence only the signal generator 52 is shown and described in detail in a subsequent portion of this specification.

The three-stage counter includes three JK flip-flops A, B and C which are interconnected by coupling the outputs Q and $\overline{Q}$ of one of the flip-flops with the K and J inputs, respectively, of another of the flip-flops. In the preferred embodiment illustrated, the outputs $Q_B$ and $\overline{Q_B}$ (i.e., the Q and $\overline{Q}$ outputs of the B flip-flop) are coupled to the K and J inputs of flip-flop A while the Q and $\overline{Q}$ outputs of flip-flop C are coupled with the K and J inputs of flip-flop B and the Q and $\overline{Q}$ outputs of flip-flop A are coupled to the K and J inputs of flip-flop C.

Each of the flip-flops A, B and C include a clock input CLK which is coupled to the VCO 40 and a divide-by-two circuit 60 so that the flip-flops are clocked at one-half of the VCO frequency.

A first AND gate 62 is connected to the Q outputs of the flip-flops A, B and C and sets the flip-flop B in the event that all of the outputs are at a logical one state. A second AND gate 64 is connected to the $\overline{Q}$ outputs of the flip-flops A, B and C and resets the flip-flop C when all of these outputs are in a logical one state. The AND gates 62 and 64 prevent an undesirable condition wherein all of the outputs are either in the logical zero or logical one state.

The three-stage counter generates three square waves which are displaced 120° with respect to successive square waves. The waveforms for the $\overline{Q}$ outputs of the flip-flops A, B and C are simply inverted with respect to the corresponding output $Q_A$, $Q_B$ or $Q_C$ (i.e. displaced 180° with respect thereto) and hence are not shown.

The waveforms $Q_A$, $Q_B$ and $Q_C$ represent the condition of the transistors Q1–Q6 in the inverter 10 during the time that the PWM pulse train on the line 36 is in a high state. For example, at time $t_1$, phase A is connected to the upper rail 16a by turning on transistor Q1 and turning off transistor Q2. Phase B, on the other hand, is connected to the lower rail 16b by turning on transistor Q4 and turning off transistor Q3. Also this time, phase C is connected to the upper rail by turning on transistor Q5 and turning off transistor Q6.

At time $t_2$, phase A is connected to the upper rail 16a while phases B and C are connected to the lower rail 16b. At time $t_3$, phases A and B are connected to the upper rail 16a while phase C is connected to the lower rail 16b.

It can be seen that at any point in the operation of the inverter 10, two of the phases are connected to one of the rails 16a, 16b while the remaining phase is connected to the other rail. Henceforth, this remaining phase will be designated the "lone phase" as a shorthand way of designating the phase which is connected to the rail opposite the rail to which the other two phases are connected.

Figure 6:
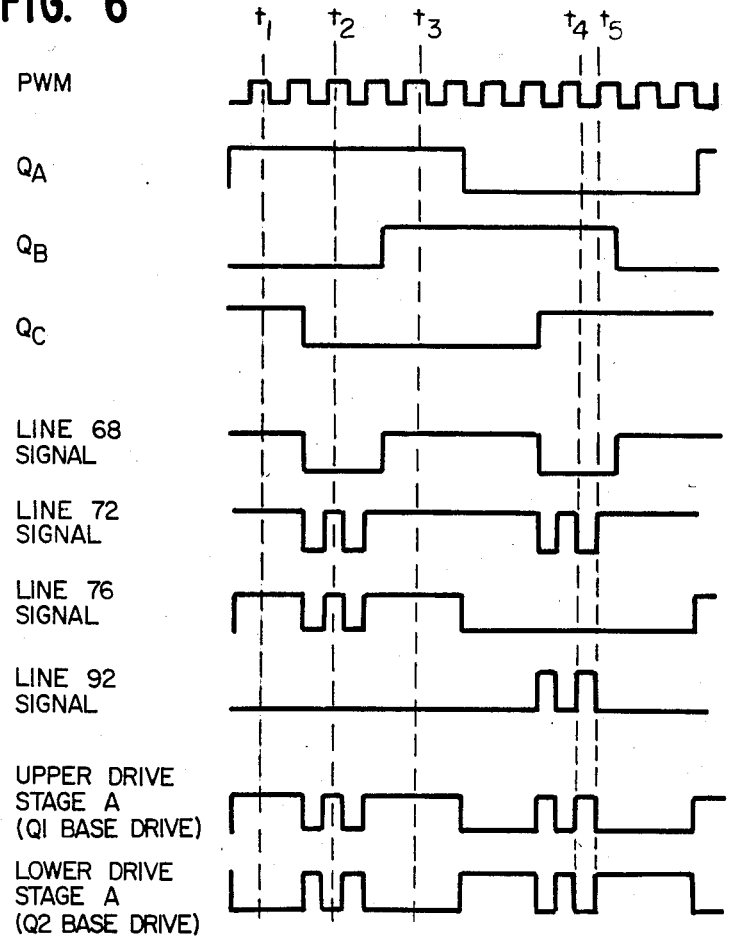
FIG. 6 is a set of waveform diagrams illustrating the operation of the circuits shown in FIG. 4 for the case of a 50% duty cycle.

Referring again to FIG. 4, an EXCLUSIVE OR gate 66 receives as inputs the waveforms $Q_B$ and $Q_C$, compares the two and develops a first signal on a line 68, such signal being illustrated in FIG. 6. When the signal on the line 68 is in a high state, then phase A cannot be the lone phase since the other two phases are connected to different rails. On the other hand, when the signal on line 68 is in a low state, then phases B and C are connected to the same rail and hence phase A is the lone phase. In other words, the EXCLUSIVE OR gate 66 and corresponding EXCLUSIVE OR gates in the signal generators 54 and 56 determine from the three phase timing waveforms which of the phases is the lone phase.

The line 68 is connected to circuitry for operating the inverter switches. An OR gate 70 receives the PWM pulse train on the line 36 illustrated in FIG. 6 and the first signal from gate 66. The OR gate 70 develops a second signal on a line 72 illustrated in FIG. 6. During the time that the signal on line 68 is in a low state, i.e., when phase A is the lone phase, the second signal on the line 72 follows the PWM wave on the line 36. At all other times, the signal on the line 72 is in a high state.

The line 72 is connected to an AND gate 74 which receives as a second input the waveform $Q_A$ from flip-flop A. The AND gate develops a third signal on a line 76, illustrated in FIG. 6, which is connected to an OR gate 78.

The third signal developed on the line 76 provides the first half-period of the control signals developed at the output of the OR gate 78 for controlling the transistors Q1 and Q2 associated with phase A. When the Q output of flip-flop A is at a logical one state and if the line 68 is high indicating that phase A is not the lone phase (indicated in FIG. 6 at $t_1$) then a high state signal is developed on the line 76 and is coupled through the OR gate 78 to an upper drive stage circuit 80 and through an inverter 82 to a lower drive stage circuit 84. It should be noted that the upper and lower drive stage circuits 80, 84 are part of the drive circuitry 26 shown in FIG. 2. The upper drive stage 80 in turn transmits a switch operating signal to the base of the transistor Q1 over a line 86 so that this transistor is turned on. Further, the lower drive stage 84 is connected to the base or transistor Q2 over a line 88, thereby ensuring that this transistor is held in an off condition. Hence, at this time, phase A is connected to the upper rail 16a shown in FIG. 5.

On the other hand, the third signal on the line 76 follows the second signal on the line 72 during the time that the phase A is the lone phase. The signal is coupled through the OR gate 78 to the upper and lower drive stages 80, 84 to drive the transistors Q1 and Q2 in an appropriate fashion. In other words, during the time phase A is the lone phase, the transistors Q1 and Q2 are operated in accordance with the PWM wave on the line 36.

During the last half of the period of the third signal on line 76, this signal is in a low state.

An AND gate 90 receives the signal $\overline{Q_A}$ and inverted versions of the first and second signals on the lines 68 and 72. A fourth signal is generated thereby on a line 92, FIG. 6, and is coupled through the OR gate 78 to upper and lower drive stages 80, 84. The signal on the line 92 provides the information for the last half of each period of the control signal from OR gate 78. In other words, the fourth signal on the line 92, and hence the output from OR gate 78, follows an inverted version of the PWM wave during the time the phase A is the lone phase during the second half of the control signal period.

The resultant switch operating signals connected from the outputs of the upper and lower drive stages 80, 84 to the bases of the transistors Q1 and Q2 are shown in FIG. 6 in the case of a 50% duty cycle.

The signal generators 54, 56, as previously noted, operate the same as the base signal generator 52 described above, the only differences being the inputs and outputs thereof. The signal generator 54 utilizes the signals $Q_A$ and $Q_C$ as inputs to an EXCLUSIVE OR gate analogous to the gate 66 and the waveforms QB and $\overline{Q_B}$ as inputs to AND gates analogous to the AND gates 74, 90. Likewise, the signal generator 56 utilizes the signals $Q_B$ and $Q_A$ as inputs to an EXCLUSIVE OR gate like the gate 66 while the signals $Q_C$ and $\overline{Q_C}$ are used as inputs to AND gates similar to the AND gates 74, 90. The signal generator 54 develops switch operating signals for the transistors Q3 and Q4 over lines 94, 96, respectively, such signals being identical to those shown in FIG. 6 with the exception that they are displaced 120° later in time relative thereto.

Similarly, signal generator 56 develops switch operating signals for the transistors Q5 and Q6 over lines 98 and 100, respectively, such signals being identical to those shown in FIG. 6 but displaced 240° later in time relative thereto.

As seen specifically in FIG. 6, the signal generators 52, 54 and 56 cause all three phases to be connected to the same rail during those times that the PWM pulse train is in a low state. As seen in FIG. 6, at time $t_4$ it is determined that phase A is the "lone phase" since both of phases B and C are connected to the upper rail. Hence, at time $t_4$, when the PWM wave assumes a low state, the switch operating signals connected to transistors Q1 and Q2 cause transistor Q1 to be turned on and transistor Q2 to be turned off so that phase A is also connected to the upper rail. In effect, the circuitry shown in FIG. 4 determines which phase is the "lone phase" and causes that phase to be connected to the rail to which the other two phases are connected when the PWM wave assumes a low state.

When the PWM wave reassumes a high state, such as at time $t_5$, phase A is again switched back to the lower rail to provide defined applied voltage to the motor 14.

Since the voltage difference between any two phases at the output of the inverter 10 is zero during those times that the PWM wave is in a low state, the inverter 10 is controlled to operate as a true control voltage source. Consequently, the voltage across the motor 14 is assured to be at a given potential at all times.

It can be seen that for each period of the PWM wave, four transitions of transistors in the inverter 10 occur, i.e., the two transistors associated with the "lone phase" both change state when the PWM wave assumes a low state and again change state when the PWM wave assumes a high state.

Also, the switching of the transistors in the inverter does not give rise to regenerative currents which are circulated back to the source of DC potential since any such currents are circulated in the loop consisting of the load, the transistors which are currently on and their associated freewheeling diodes connected across the collector-emitter circuit thereof. Hence, the DC source can be of a type which cannot accept regenerative currents. Also, the size of the DC bus filter between the DC source and the inverter may be reduced, or the filter can be altogether eliminated.

As previously noted, the present invention is useful not only in three-phase inverters, but also can be used in connection with n-phase inverters without departing from the spirit and scope of the invention. In such a case, the counter 50 is an n-stage counter which develops n phase timing or fundamental waveforms which are identical to one another except displaced $360 \div n$ electrical degrees with respect to successive fundamental waveforms. Further, there are n signal generators, each one controlling the conduction of one of n pairs of switches in the inverter connected across the upper and lower rails 16a, 16b.

For the generalized case of an n-phase inverter having n pairs of switches connected across upper and lower rails with phase outputs A, B, C . . . N being developed at junctions between the switches of each pair, at any particular time $n_1$ of the phase outputs are connected to one of the rails while $n_2$ of the phase outputs are connected to the other rail, where $n_1+n_2=n$. The number $n_1$ is defined as follows:

$n_1 \leq n_2$ $n_1 = n/3$ rounded up to the next whole number

A table of values for $n_1$ and $n_2$ for $n=3$ through $n=9$ is given below:

| n (# of phases) | $n_1$ | $n_2 = n - n_1$ |
|---|---|---|
| 3 | 1 | 2 |
| 4 | 2 | 2 |
| 5 | 2 | 3 |
| 6 | 2 | 4 |
| 7 | 3 | 4 |
| 8 | 3 | 5 |
| 9 | 3 | 6 |

It can be seen that $n_1 = n_2$ only for the case $n=4$. In all other cases, $n_1$ is less than $n_2$.

The example $n=3$, discussed in detail above, is merely a special case where there is only one phase output (identified as the "lone phase") which is complemented (i.e. switched from one rail to the other) during the low state of the PWM wave. In the generalized case of an n-phase inverter, the number $n_1$ represents the minimum number of phases which are complemented during low state portions of the PWM wave to insure zero voltage across the load.

For the general case of an n-phase inverter, each signal generator includes a logic network analogous to the gates 66, 70, 74, 78, 82 and 90 which receives the n fundamental waveforms to determine or identify whether the phase output controlled thereby is one of the $n_1$ phase outputs which is to be complemented when the PWM wave is in the low state.

The switches in the inverter are controlled, as before, with a minimum of switching transitions to achieve the voltage source control without the generation of regenerative currents which are coupled back to the DC source.

I claim:

1. An improved method of operating a voltage source inverter which generates n-phase AC voltages from a DC source which develops two voltage levels on two rails, the inverter having n pairs of switches coupled across the two rails which are operated in on and off states to connect a junction between the switches of a pair to one of the rails to develop a phase output at the junction, the inverter being controlled by n-phase logic circuitry which receives a clock signal and a pulse width modulated, or PWM, wave switching between a high and a low state, the improvement comprising:

generating n phase timing waveforms from the clock signal, each phase timing waveform representing the condition of a pair of switches in the inverter when the PWM wave is in the high state;

identifying $n_1$ and $n_2$ phase outputs from the n phase timing waveforms, $n_1$ of the phase outputs being connected to one rail while $n_2$ phase outputs are connected to the other rail, where $n_1 \leq n_2$ and $n_1 + n_2 = n$; and operating the switches associated with the $n_1$ phases such that the phase outputs are all connected to the same rail when the PWM wave is in the low state whereby a defined applied voltage output is produced with a minimum number of switch transitions between the on and off states.

2. An improved method of operating a voltage source inverter which generates three-phase AC voltages from a DC source which develops two voltage levels on two rails, the inverter having three pairs of switches coupled across the two rails which are operated in one and off states to connect a junction between the switches of a pair to one of the rails to develop a phase output at the junction, the inverter being controlled by three-phase logic circuitry which receives a clock signal and a pulse width modulated, or PWM, wave switching between a high and a low state, the improvement comprising:

generating three phase timing waveforms from the clock signal representing the condition of the switches associated with each phase output in the inverter when the PWM wave is in the high state;

determining from the three phase timing waveforms which of the phase outputs is connected to one of the rails while the other phase outputs are connected to the other voltage level; and operating the switches associated with the determined phase such that the phase outputs are all connected to the same rail when the PWM wave is in the low state whereby a voltage controlled output is produced with a minimum number of switch transitions between the on and off states.

3. The improvement of claim 2, wherein the three-phase logic circuitry includes three signal generators, each signal generator developing signals to operate a pair of switches and thereby control the connection of the associated phase output to one of the rails and wherein the determining step includes the step of comparing in each signal generator the timing waveforms representing the condition of the switches not operated by that signal generator to determine whether the associated phase output is connected to the one rail.

4. The method of claim 3, wherein the comparing step includes the step of performing a logical EXCLUSIVE OR operation on two phase timing waveforms to generate a first signal.

5. The method of claim 4, wherein the operating step includes the step of combining the first signal with the PWM wave in a logical OR gate to generate a second signal.

6. The method of claim 5, wherein the operating step further includes the step of combining in each signal generator the second signal with the phase timing waveform representing the condition of the switches operated by that signal generator in a logical AND gate to generate a third signal containing a portion of the information needed to operate such switches.

7. The method of claim 6, wherein the operating step further includes the steps of inverting the first and second signals and combining in each signal generator the inverted first and second signals with an inverted version of the phase timing waveform representing the condition of the switches operated by that signal generator in a logical AND gate to generate a fourth signal containing the balance of the information needed to operate such switches.

8. The method of claim 7, wherein the operating step includes the further step of combining in each signal generator the third and fourth signals in a logical OR gate to generate a control signal for the switches operated by such signal generator.

9. The method of claim 8, wherein the operating step includes the further steps of operating one of the switches of the pair in accordance with the control signal, inverting the control signal and operating the other switch of the pair in accordance with the inverted control signal.

10. The method of claim 2, wherein the three-phase logic circuitry includes a counter having three outputs and wherein the generating step includes the step of generating in the counter the three phase timing waveforms which are identical except that they differ 120 electrical degrees from one another.

11. An apparatus for operating a voltage source static inverter which generates three-phase AC voltages from a DC source developing two voltage levels on two rails, the inverter having three pairs of switches connected across the rails which are operated between on and off states to develop a phase output at a junction between the switches of each pair, the inverter being operated in conjunction with a clock signal and a pulse width modulated, or PWM, wave switching between a high and a low state, comprising:
means for generating three phase timing waveforms from the clock signal representing the condition of the pairs of switches associated with the phase outputs when the PWM wave is in the high state;
means coupled to the generating means for determining from the three phase timing waveforms which of the phase outputs is connected to one of the rails while the other phase outputs are connected to the other rail when the PWM wave is in the high state; and
means coupled to the determining means for operating the switches associated with the determined phase output such that the phase outputs are all connected to the other rail when the PWM wave is in the low state whereby a defined voltage output is produced with a minimum number of switch transitions between the on and off states.

12. The apparatus of claim 11, wherein the switches each comprise a transistor having a base electrode and wherein the operating means includes means coupled to the base electrodes of the transistor for developing switch operating signals to render one of the transistors of each pair conductive when the PWM wave is in a high state such that one of the phase outputs is connected to the one rail while the other phases are connected to the other rail, the developing means including means for rendering non-conductive the transistor associated with the determined phase output connected to the one rail and rendering conductive the transistor associated with the determined phase output connected to the other rail when the PWM wave is in the low state.

13. The apparatus of claim 11, wherein the determining means includes an EXCLUSIVE OR gate having inputs connected to two of the three phase timing waveforms and an output which develops a first signal which assumes a certain state when the voltage levels represented by such phase timing waveforms are the same.

14. The apparatus of claim 13, wherein the operating means includes first means for combining the first signal with the PWM wave such that the switches associated with the determined phase output are operated in accordance with the PWM wave when the first signal is in the certain state.

15. Apparatus for operating a voltage source static inverter which generates three-phase AC voltages from a DC source developing two voltage levels on two rails, the inverter having three pairs of switches operated in on and off states and connected across the two rails with phase outputs being developed at junctions between the switches of an associated pair, only one of the switches of each pair being operated at any time to connect the associated phase output to one of the rails while the remaining phase outputs are connected to the other rail, the inverter being operated in conjunction with a clock signal and a pulse width modulated, or PWM, wave switching between first and second states, comprising:
means for generating three phase timing waveforms from the clock signal representing the condition of the switches in the inverter when the PWM wave is in the first state; and
three signal generators for controlling the phase outputs, each signal generator generating switch operating signals for operating a pair of switches associated with one of the phase outputs and having developing means coupled to two phase timing waveforms for developing a first signal which assumes a certain state when the phase output controlled by such signal generator is connected to one of the rails while the remaining phase outputs are connected to the other rail and operating means coupled to the developing means for operating the switches associated with such phase output to connect all of the phase outputs to the other rail when the PWM wave is in the second state and the first signal is in the certain state whereby a defined applied voltage output is produced with a minimum number of switch transitions between the on and off states.

16. The apparatus of claim 15, wherein the developing means comprises an EXCLUSIVE OR gate having inputs connected to two of the phase timing waveforms and an output which develops the first signal.

17. The apparatus of claim 15, wherein the operating means includes means for combining the PWM wave with the first signal so that the switches associated with such phase outputs are operated in accordance with the PWM wave when the first signal is in the certain state.

18. The apparatus of claim 17, wherein the combining means includes an OR gate having inputs connected to the PWM wave and the first signal and an output which develops a second signal.

19. The apparatus of claim 18, wherein the operating means further includes an AND gate having inputs connected to the second signal and to the fundamental waveform representing the condition of the switches associated with such phase output and an output which generates a third signal containing a portion of the information needed to operate such switches.

20. The apparatus of claim 19, wherein the operating means further includes an AND gate for combining inverted versions of the first signal, the second signal and the fundamental waveform representing the condition of the switches associated with such phase output to derive a fourth signal containing the balance of the information needed to operate such switches.

21. The apparatus of claim 20, wherein the operating means further includes an OR gate for combining the third and fourth signals to generate a control signal.

22. The apparatus of claim 21, wherein the operating means further includes means for operating one of the switches associated with such phase output in accordance with the control signal, means for inverting the control signal and means for operating the other of the switches associated with such phase output in accordance with the inverted control signal.

* * * * *